(No Model.)

C. JESSEMAN.
MECHANISM FOR OPERATING A DRAG SAW.

No. 243,911. Patented July 5, 1881.

Witnesses.
S. N. Piper
L. N. Miller

Inventor.
Charles Jesseman.
by R. H. Eddy atty.

UNITED STATES PATENT OFFICE.

CHARLES JESSEMAN, OF LISBON, NEW HAMPSHIRE.

MECHANISM FOR OPERATING A DRAG-SAW.

SPECIFICATION forming part of Letters Patent No. 243,911, dated July 5, 1881.

Application filed May 31, 1881. (No model.)

*To all whom it may concern:*

Be it known that I, CHARLES JESSEMAN, of Lisbon, of the county of Grafton and State of New Hampshire, have invented a new and useful Improvement in Mechanism for Operating a Drag-Saw; and I do hereby declare the same to be described in the following specification, and represented in the accompanying drawings, of which—

Figure 1:
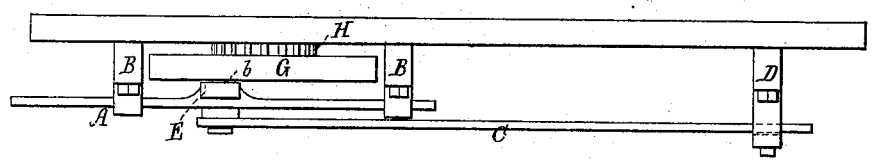
Figure 2:
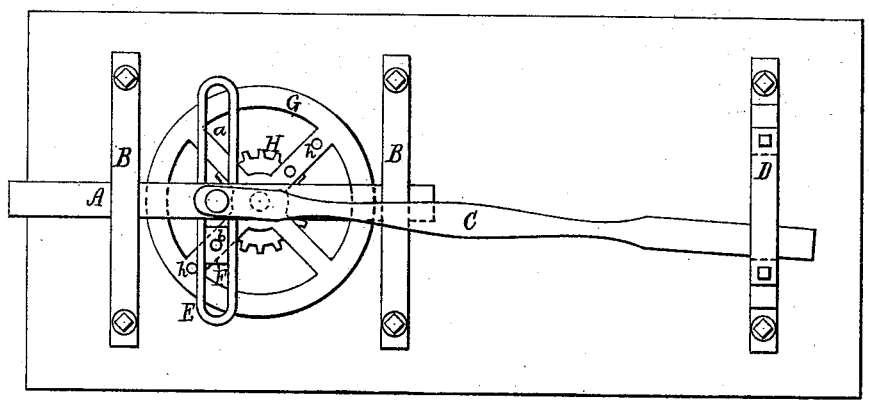

Figure 1 is a top view, and Fig. 2 a front elevation, of it.

The nature of my invention is duly defined in the claim hereinafter made, such invention being to enable the machine usually termed a "horse-power" to be employed in effecting the reciprocations of a drag-saw.

In the drawings, A denotes a straight bar arranged to slide lengthwise rectilinearly in brackets or guide-supporters B B.

C is a connecting-rod, which, near its rear end, is pivoted to the said bar A, and at its front end is joined, or is to be joined, to a drag-saw. This connecting-rod slides through and plays up and down in a guide, D.

A slotted plate, E, is fixed at its middle to the bar A on its under side and at its middle, and has within its straight slot $a$ a slide, F, which turns upon a pin or stud, $b$, projecting from one arm of a balance-wheel, G, fixed to a gear, H, at one side thereof and concentrically with it. This gear is to engage with the driven gear of a horse-power, and when placed in engagement therewith and the horse-power is in operation, will be revolved, and in so doing will revolve the wheel, and thereby, by means of the stud $b$, slotted plate E, and slide F, cause the slide A to have a reciprocating rectilinear movement, whereby the connecting-rod C, with its saw, will be drawn backward and forced forward, as occasion may require, the connecting-rod admitting the saw to drop, by its gravity, on the log or article to be sawed by it as the sawing of the log may progress. The two diametric arms of the wheel are provided with a series of holes, $h$, to admit of the pin or stud $b$ being shifted nearer to or farther from the axis of the wheel, as may be desirable for varying the play or length of reciprocating movement of the saw, as occasion may require.

A crank connecting the wheel with the connecting-rod will not answer for the drag-saw, as it would cause the saw to vibrate vertically in sawing and not to make a kerf having a straight bottom; but the slide A, with the slotted plate E, stud or pin $b$, and slide F, connecting the said rod with the balance-wheel, effect a rectilinear or practically straight movement of the saw.

The balance-wheel having holes or perforations in its diametric arms, as described, not only enables the extent of reciprocation of the saw to be varied, as described, but facilitates by its momentum while in revolution the back passage or drag of the saw.

What I claim is—

The combination of the balance-wheel G, provided with a series of pivotal holes, $h$, arranged in it, as described, the driving-gear H, pin or stud $b$, slide F, slotted plate E, slide-bar A, guides B B D, and saw-connecting rod C, all adapted and arranged substantially as and to operate as set forth.

CHARLES JESSEMAN.

Witnesses:
SEWALL T. MOFFETT,
GEO. H. DOW.